(12) United States Patent
Du-Cuny et al.

(10) Patent No.: US 7,381,265 B2
(45) Date of Patent: Jun. 3, 2008

(54) METHOD FOR CRYSTALLIZATION OF A WEAKLY ACIDIC AND/OR WEAKLY BASIC COMPOUND

(75) Inventors: Lei Du-Cuny, Lörrrach (DE); Manfred Kansy, Freiburg (DE); Jörg Huwyler, Burg (CH)

(73) Assignee: Hoffmann-La Roche Inc., Nutley, NJ (US)

( * ) Notice: Subject to any disclaimer, the term of this patent is extended or adjusted under 35 U.S.C. 154(b) by 0 days.

(21) Appl. No.: 11/511,936

(22) Filed: Aug. 28, 2006

(65) Prior Publication Data

US 2007/0044705 A1 Mar. 1, 2007

(30) Foreign Application Priority Data

Aug. 30, 2005 (EP) .................................. 05018750

(51) Int. Cl.
*H01L 21/322* (2006.01)
(52) U.S. Cl. .......................................................... 117/2
(58) Field of Classification Search ..................... 117/1
See application file for complete search history.

(56) References Cited

OTHER PUBLICATIONS

F. Wang, K. A. Berglund, Monitoring pH Wing Crystallization of Nicotinic Acid by the Use of Attenuated Total Reflexion Fourier Transform Infrared Spectrometry, *Ind. Eng. Chem. Res.*, vol. 39, No. 6, May 5, 2000 p. 2101-2104 XP002365832.

Database WPI Section Ch, Week 200430 Derwent Publications Ltd., London, GB, AN 2004-317190 & CN 1 462 751 A (Baiyunshan Chem Pharmaceutical Factory G) Dec. 24, 2003.

*Primary Examiner*—Robert Kunemund
*Assistant Examiner*—Marissa W Chaet
(74) *Attorney, Agent, or Firm*—Cohen Pontani Lieberman & Pavane LLP

(57) ABSTRACT

A method for crystallization of a weakly acidic and/or weakly basic compound having an uncharged form and at least one charged form comprises the steps of:

a) providing a solution of said compound in a solvent having an initial pH-value and an initial total concentration of said compound, said initial pH-value being chosen such that the compound is present in said solution predominantly in said charged form, said initial total concentration being chosen larger than the intrinsic solubility of said uncharged form;

b) gradually changing the pH-value of said solution in a direction that leads to a decrease of said compound's solubility until reaching a predetermined target pH-value at which said solution is in a substantially saturated state and the concentration of said uncharged form is substantially equal to said intrinsic solubility thereof; and c) maintaining said solution in a substantially saturated state while allowing formation of crystals of said compound.

5 Claims, 5 Drawing Sheets

METHOD FOR CRYSTALLIZATION OF A WEAKLY ACIDIC AND/OR WEAKLY BASIC COMPOUND

TECHNICAL FIELD OF THE INVENTION

The present invention relates to a method for crystallization of a weakly acidic and/or weakly basic compound and to an apparatus for carrying out such method.

BACKGROUND OF THE INVENTION

Crystallization is an important purification and separation technique in a variety of commercial processes, as for example biotechnology, mineral processing, waste treatment, energy storage, new materials and electronic chemicals. Crystallization can occur in solution, from vapor or from melt. Most processes in the chemical industries use crystallization from solution, and the starting point for it is the creation of a saturated solution. However, with the currently known methods the formation of a saturated solution is often a time-consuming process. Usually, it takes days until the equilibrium between the compound's soluble and insoluble forms has been reached. Hence, instead of a saturated solution, a supersaturated solution is used in most instances as the starting point for the crystallization. However, in such cases it is important to know the level of supersaturation, since the supersaturation appropriate for crystallization varies from compound to compound and depends on the compound's ability for crystallization. In general, with decreasing level of supersaturation the crystal growth becomes slower and the crystal quality improves.

Wang has tried to obtain a very high supersaturation of nicotinic acid by adding hydrochloric acid to a sodium nicotinate aqueous solution (Wang, F and Berglund, K A. *Monitoring pH swing crystallization of nicotinic acid by the use of attenuated total reflection Fourier transform infrared spectrometry*. Industrial & Engineering Chemistry Research 39(6), 2000, 2101-2104). The point of highest supersaturation was then used as the starting point for the nicotinic acid crystallization.

Another example is controlled batch crystallization by pH variation, developed by Zhu (Zhu, J and Garside, *J. Controlled batch crystallization by pH variation*. Jubilee Research Event, a Two-Day Symposium, Nottingham, UK, Apr. 8-9, 1997, 1, 449-452). According to Zhu, a short pulse of supersaturation initialized crystallization, and during the whole crystallization process, pH change was used in order to maintain a constant level of supersaturation. Furthermore, Zhu tried to raise the level of supersaturation as high as possible in order to shorten operation time.

However, supersaturation is considered to be a risk for the formation of amorphous material and for crystal defect occurrence. Therefore, with the presently known methods for crystallization relying on supersaturated solutions, one has to establish an appropriate level of supersaturation in each case, trying to find a compromise between the rate of crystallization and the quality of crystals formed.

SUMMARY OF THE INVENTION

It is the principal object of the present invention to overcome the limitations and disadvantages of currently known methods for crystallization.

The foregoing and further objects are achieved by the method and the apparatus of the present invention.

According to one aspect of the invention, there is provided a method for crystallization of a weakly acidic and/or weakly basic compound, said compound having an uncharged form and at least one charged form, said method comprising the steps of:

a) providing a solution of said compound in a solvent having an initial pH-value and an initial total concentration of said compound, said initial pH-value being chosen such that the compound is present in said solution predominantly in said charged form, said initial total concentration being chosen larger than the intrinsic solubility of said uncharged form;

b) gradually changing the pH-value of said solution in a direction that leads to a decrease of said compound's solubility until reaching a predetermined target pH-value at which said solution is in a substantially saturated state and the concentration of said uncharged form is substantially equal to said intrinsic solubility thereof; and c) maintaining said solution in a substantially saturated state while allowing formation of crystals of said compound.

In this procedure, one starts out with a comparatively concentrated, but not saturated solution of the compound of interest, i.e. with a total concentration that is larger than the intrinsic solubility of the uncharged form. By gradually changing the pH-value of the solution in a direction that leads to a decrease of said compound's solubility, one can rapidly proceed to a situation in which the solution is in a substantially saturated state. By maintaining the solution in a substantially saturated state, crystallization is then carried out under the most desirable conditions. In particular, one can avoid the drawbacks associated with crystallization from a supersaturated state.

The method of this invention is applicable to a variety of solvents; in particular, the solvent may be water or a water based solvent mixture. A prerequisite for the applicability is that the compound of interest behaves in said solvent as a weak acid and/or as a weak base. In the present context, a weak acid shall be understood as a compound with a pK-value of 2 to 7, whereas a weak base shall be understood as a compound with a pK-value of 7 to 12. The method is also applicable to compounds with more than one pK-value.

The total concentration of a compound having more than one form is defined as the sum of the concentrations of all the compound's forms present in solution. At equilibrium, this total concentration is equal to the effective solubility of the compound.

The intrinsic solubility of a compound in a given solvent system is defined as the maximum concentration of the uncharged form that can be achieved in an equilibrium situation where the precipitate of the uncharged form exists. Accordingly, the intrinsic solubility of a weak acid and/or base is equal to the equilibrium total concentration of that compound under conditions where essentially all of the compound is present in its uncharged form. Such conditions may be achieved for many weakly acidic and/or basic compounds by appropriate adjustment of the pH-value. Methods for determining the intrinsic solubility are known in the art (see e.g. Avdeef, A. *pH-metric solubility. 1. Solubility-pH profiles from Bjerrum plots. Gibbs buffer and pKA in the solid state*. Pharmacy and Pharmacology Communications 4(3), 1998, 165-178).

Advantageous embodiments of the invention are defined in the dependent claims.

In one embodiment, the above mentioned step b) further comprises raising the total concentration of said compound. Advantageously, this is achieved by inducing a slow evaporation of said solvent, in particular after having adjusted the pH-value to said target pH-value.

In a further embodiment, the step of maintaining said solution in a substantially saturated state comprises keeping the pH-value substantially constant while inducing a slow evaporation of said solvent.

In another embodiment, the step of maintaining said solution in a substantially saturated state comprises monitoring the concentration of said uncharged form and regulating the pH-value so that the concentration of said uncharged form is kept within a predefined tolerance range above said intrinsic solubility thereof. In practice, this will require monitoring the concentration of the uncharged form continuously or from time to time. If said concentration reaches a value outside said predefined tolerance range, a small amount of a strong acid or strong base, e.g. hydrochloric acid or potassium hydroxide, respectively, is added to the solution until the concentration of the uncharged form is back within the tolerance range.

In yet another embodiment, the step of maintaining said solution in a substantially saturated state comprises monitoring the total concentration of said compound and regulating the pH-value so that the total concentration of said compound is kept within a predefined tolerance range above a predetermined total solubility profile. In practice, this will require monitoring the total concentration continuously or from time to time. Moreover, it will require having access to a previously determined profile of the total concentration of said compound as a function of pH-value, at least in the pH-range of interest. Methods for determining such solubility profiles are known in the art (see e.g. Avdeef, A. *Physicochemical profiling (solubility, permeability and charge state). Current Topics in Medicinal Chemistry (Hilversum, NL)* 1(4), 2001, 277-351). If the compound's total concentration at an instant pH-value differs from said total solubility profile by more than said predefined tolerance range, a small amount of a strong acid or strong base, e.g. hydrochloric acid or potassium hydroxide, respectively, is added to the solution until the total concentration at the resulting pH-value is back within the tolerance range.

According to another aspect of the invention, there is provided an apparatus for carrying out crystallization of a weakly acidic and/or weakly basic compound, said apparatus comprising:
a) a container for said solution;
b) a probe for measuring the pH-value of said solution;
c) dosing means for adding controlled amounts of acid and base to said solution;
d) sensor means for measuring the concentration of at least one compound form present in solution; and
e) control means acting on said dosing means in response of signals received from said pH-probe and from said sensor means, said dosing means being programmed so as to regulate said pH-value to match a predefined profile.

BRIEF DESCRIPTION OF THE DRAWINGS

The above mentioned and other features and objects of this invention and the manner of achieving them will become more apparent and this invention itself will be better understood by reference to the following description of various embodiments of this invention taken in conjunction with the accompanying drawings, wherein.

DETAILED DESCRIPTION OF THE INVENTION

EXAMPLES

Diclofenac, famotidine, flurbiprofen, furosemide, hydrochlorothiazide, ketoprofen, propanolol and quinine were used as examples. These compounds are commercially available. All of these compounds are a weak acid or base or an ampholyte with pK-values which generally lie within the range from 2 to 10.

Solubility of Weak Bases and/or Acids

Figure 1:
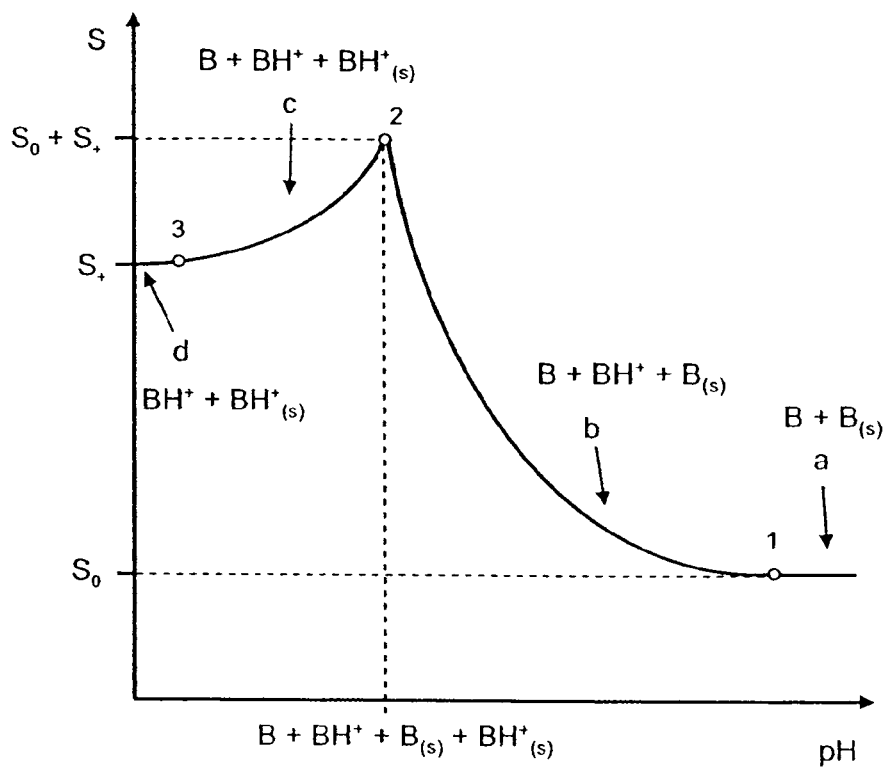
FIG. 1: shows a solubility-pH profile of a weak base B.

FIG. 1 shows the solubility profile of a weak base B in terms of the effective solubility S as a function of pH-value. The effective solubility S is equal to the compound's total concentration at equilibrium. Such profiles will also be addressed as "solubility-pH profiles". For the time being, it will be assumed that there is an equilibrium situation with a solution of base B and a substantial amount of solid in contact with the solution. At very high pH-values (Region a), essentially all of the compound is present as the uncharged base form B, also called the free base form. At very low pH-values (Region d), essentially all of the compound is present as the protonated form $BH^+$. At intermediate pH-values, the uncharged form and the protonated form coexist in a ratio that depends on the pH-value. The effective solubility S is equal to the sum of the concentrations of B and $BH^+$ at equilibrium. As seen from FIG. 1, the solubility of the uncharged form, also called the intrinsic solubility $S_0$, is smaller than the solubility $S_+$ of the protonated form, also called the salt solubility.

Considering again Region a, it is found that the effective solubility S is essentially independent of pH. This is because at very high pH-values a slight change in pH-value has virtually no effect on the ratio between uncharged form and protonated form, which ratio is very large. Accordingly, the effective solubility S is essentially equal to the intrinsic solubility $S_0$.

Considering now the situation of somewhat lower pH-values (see Region b in FIG. 1), some of the compound will be in its protonated form $BH^+$. The effective solubility S now comprises two terms reflecting the contributions of the uncharged form and the protonated form, respectively. In Region b, lowering the pH-value is associated with an increase in effective solubility. The underlying equilibria may be described as:

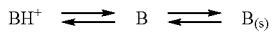

In other words, the uncharged form B in solution is in equilibrium with its charged counterpart $BH^+$ in solution and also with the uncharged solid form $B_{(s)}$.

In Region b, lowering the pH induces protonation of B to $BH^+$, which in turn induces dissolution of solid $B_{(s)}$ in order to replace the "missing" B.

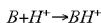

This process will continue until a so-called "perfect" buffer system is reached (see e.g. Avdeef, A., 2001, loc. cit.). At that point, designated as point 2 in FIG. 1, the solid free base $B_{(s)}$ and its solid conjugate acid $BH^+_{(s)}$ coexist and thereby force the pH and the effective solubility to be constant as long as the two inter-converting solids are present. This special pH point has been designated as the Gibbs' $pK_a$ ($pK_a^{GIBBS}$). The equilibrium equation associated with this phenomenon is $$BH^+_{(s)} \rightleftharpoons B_{(s)} + H^+$$

with associated equilibrium constant given by $$K_a^{GIBBS} = \frac{\{H^+\}\{B_{(s)}\}}{\{BH^+_{(s)}\}}$$

The effective solubility at the point 2 is given by the sum of the intrinsic solubility and the salt solubility:

Moving from point 2 to still lower pH-values (i.e. into Region c) where the solid phase consists of the protonated form $BH^+_{(s)}$ only, the concentration of $BH^+$ is constant and equal to the salt solubility. Protonation of B to $BH^+$ leads to formation of further protonated solid and to a loss of component B in solution.

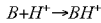

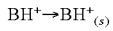

Therefore, the effective solubility decreases until Region d is reached. In Region d, there is no more B that can be transformed into $BH^+_{(s)}$ and the prevailing equilibrium is now described by:

Figure 2:
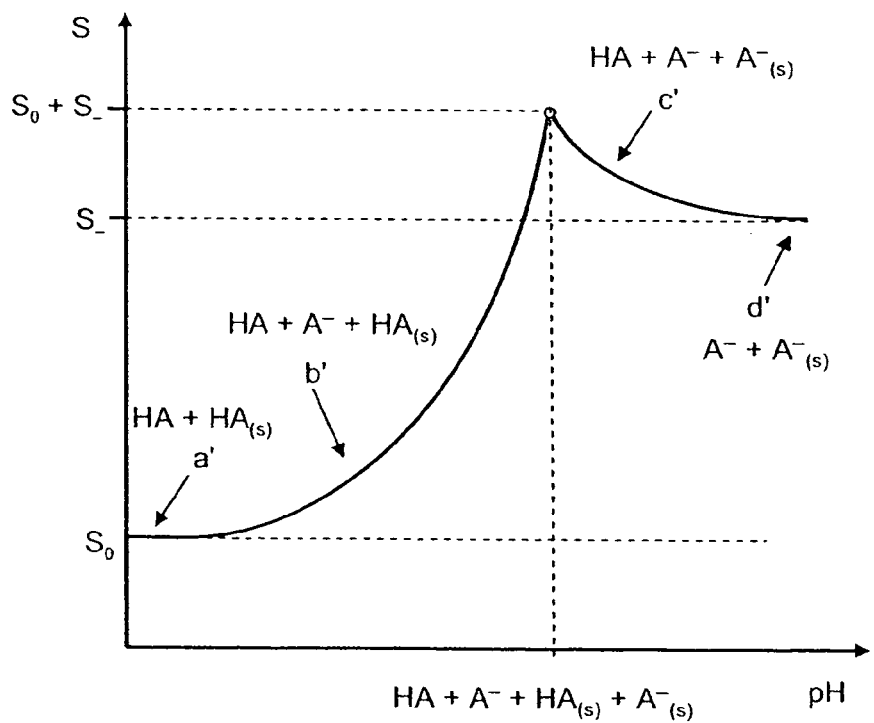
FIG. 2 shows a solubility-pH profile of a weak acid HA.

When dealing with a weakly acidic compound HA instead of a weak base B, the pertinent solubility profile has the general appearance shown in FIG. 2. Here the uncharged form HA, also called the free acid form, predominates at low pH-values, whereas at higher pH-values there is an increasing deprotonation to yield the negatively charged form $A^-$.

When dealing with a compound with more than one pK-value, the solubility profile will have the appearance of a combination of the profiles shown in FIGS. 1 and 2, with the substance being positively charged under acidic conditions and negatively charged under basic conditions.

Solubility Determination

Figure 3:
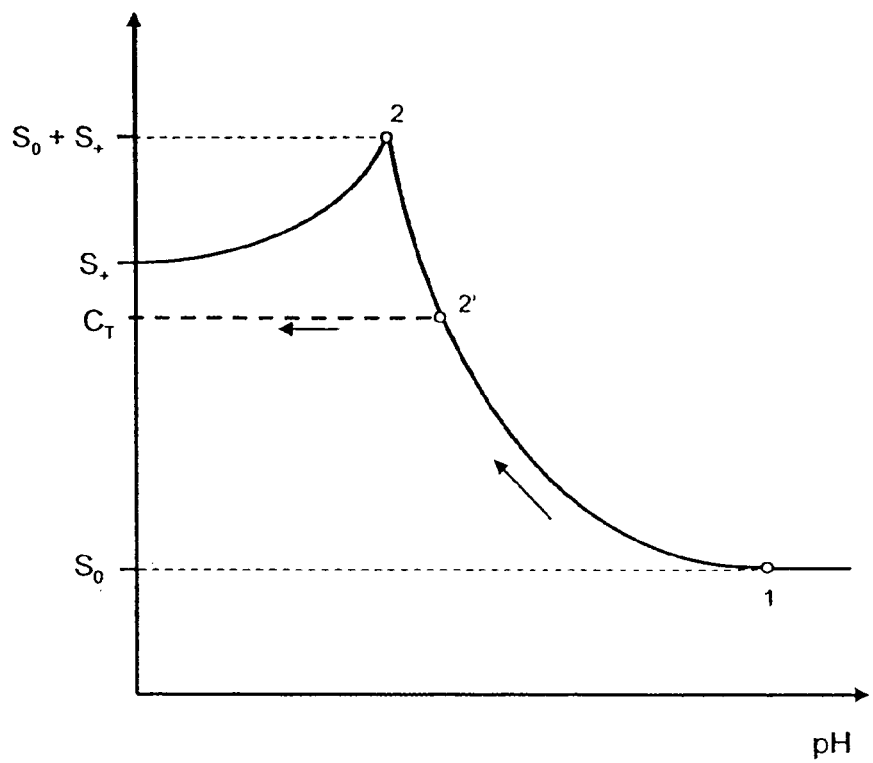
FIG. 3 shows the solubility-pH profile of a weak base according to FIG. 1 with the path for a titration from high to low pH-values starting with a saturated solution and a moderate amount of solid.

The above described titration e.g. of a weak base B from high to low pH-values is used for potentiometric determination of solubility profiles according to the so-called "pSol method" (see e.g. Avdeef, A., 1998, loc. cit.). However, in pSol titrations the phenomenon of a "perfect" buffer system is not encountered frequently because in order to obtain good titration results it is advisable to use only small amounts of the compound under investigation. This leads to a situation where the whole amount of the compound is dissolved before the maximal effective concentration corresponding to point 2 in FIG. 1 is reached. This is illustrated in FIG. 3, where reduction of the pH-value leads along the solubility profile until reaching the point denoted as 2' in FIG. 3. At this point the compound has completely dissolved; the amount in solution does not change when reducing the pH-value further, as shown by the horizontal dashed line in FIG. 3. Therefore, the total concentration of the compound remains constant at a value $C_T$.

Measurements of solubility-pH profiles were carried out on a "pSol" apparatus (see e.g. Avdeef, A., 2001, loc. cit.). The potentiometric solubility measurement with the pSol apparatus takes as input parameters the weighted amount of the said compound, the volume of the solution, the measured $pK_a$ and the measured (or calculated) octanol/water partition coefficient, logP. The latter parameter is used to estimate the intrinsic solubility, $S_0$, using the Hansch-type expression $$\log S_0 = 1.17 - 1.38 * \log P$$

or an improved version for ionizable molecules of moderate lipophilicity, $$\log S_0 = -2.17 - 0.0082 \log P - 0.134 (\log P)^2$$

Using the weighted amount of the said compound, the volume of the solution, the $pK_a$ and the estimated $S_0$, a numerical procedure simulates the entire titration curve before the assay. The simulated curve serves as a template for the instrument to collect individual pH measurements in the course of the titration. The pH domain containing precipitation is apparent from the simulation. Titration of the sample suspension is done in the direction of dissolution, eventually well past the point of complete dissolution. The rate of dissolution of the solid, described by the classical Noyes-Whitney expression, depends on a number of factors which the instrument takes into account. For example, the instrument slows down the rate of pH data taking as the point of complete dissolution approaches; where the time needed to dissolve additional solid substantially-increases. Only after the precipitate completely dissolves does the instrument collect the remainder of the data rapidly. Typically, 3 to 10 hours are required for the entire equilibrium solubility data-collection. The more insoluble the compound is anticipated to be (based on the template), the longer the assay time.

Bjerrum Plots

As generally known in analytical chemistry, a Bjerrum plot is a plot of $n_H$ against pH, wherein $n_H$ is the average number of bound hydrogens in a molecule of the substance.

Figure 4:
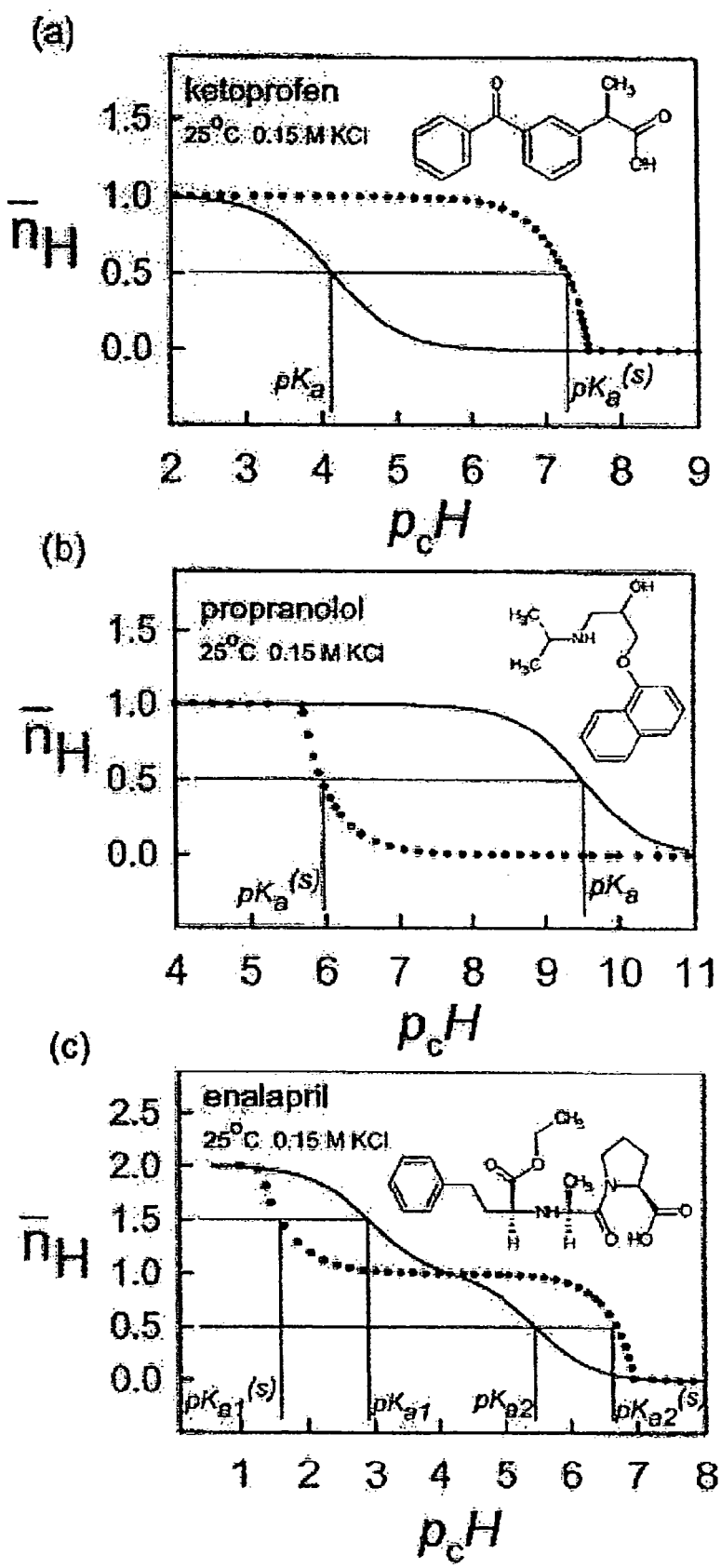
FIG. 4 shows Bjerrum plots of saturated solutions of: (a) ketoprofen (acid); (b) propanolol (base); and (c) enalapril (ampholyte)

The Bjerrum plot reveals any $pK_a$-values in terms of the pH-values at half-integral positions of $n_H$. As will be appreciated from the above description of the various equilibria involved, the presence of precipitate causes leads to a shift of the Bjerrum plot resulting in an apparent $pK_a$-value, henceforth denoted as $pK_a^{APP}$, which is shifted to higher values for acids and to lower values for bases. This is shown in FIG. 4 for saturated solutions of: (a) ketoprofen (which behaves as a weak acid); (b) propanolol (which behaves as a weak base); and (c) enalapril (which behaves as an ampholyte).

The intrinsic solubility So can be deduced by inspection of the curves, applying the relationship.

$$\log S_0 = \log(C/2) - |pK_a^{APP} - pK_a|$$

wherein C is the sample concentration.

Beside solubility-pH profiles and Bjerrum plots, another type of profiles obtained from the pSol-method are the Flux Factor Profiles (see e.g. Avdeef, A., 1998, loc. cit.). A Flux Factor Profile is a diagram showing the concentration fractions of all the species of a compound as a function of pH.

Crystallization Method

Figure 5:
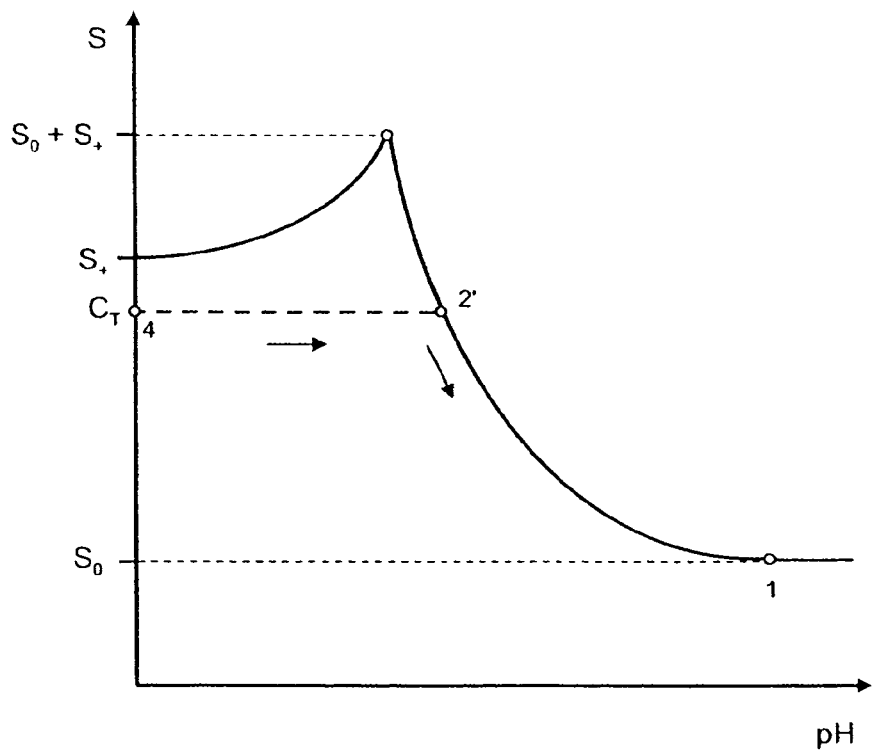
FIG. 5 shows the solubility-pH profile of a weak base according to FIG. 1 with the path for a titration from low to high pH-values with an unsaturated solution.

In order to obtain crystals, the direction of titration described above in relation to FIG. 3 is reversed. In the case of a weakly basic compound B, one starts with an unsaturated solution of the compound at a low initial pH-value as illustrated in FIG. 5 by means of point 4. In other words, the initial pH-value and the initial total concentration $C_T$ are chosen such that the compound is present in solution predominantly or even entirely in its charged form $BH^+$. As seen from FIG. 5, the initial total concentration $C_T$ is larger than the intrinsic solubility $S_0$ of the uncharged form B.

Subsequently, the pH value is gradually increased. This leads to an increasing deprotonation of $BH^+$ to B, but initially there is no precipitation of solid phase. On reaching point 2', the titration is stopped. At this target point 2' the concentration of the uncharged form has reached its maximal value $[B]_{max}$ which is equal to the intrinsic solubility $S_0$. Therefore, a saturated solution of the compound of interest has been reached that may serve to carry out a crystallization under substantially saturated conditions.

It should be noted that the target point 2' may be chosen anywhere on the solubility-pH profile, as long as the total concentration at point 2' lies between So and $S_0 + S_+$ as shown in FIG. 5. For example, one could start with a nearly saturated solution, i.e. with an initial total concentration $C_T$ only slightly below the salt solubility $S_+$ and could then gradually increase the pH-value until reaching the associated intersection point 2' on the solubility-pH profile.

However, due to practical limitations, it may be difficult to reach the target point 2' very precisely. If too much base is added, the pH-value goes beyond the target pH-value corresponding to point 2' and a supersaturated solution can form. Therefore, the titration is usually stopped at a point very close to the solubility-pH profile that corresponds to a slightly unsaturated solution. By keeping the solution in an uncovered bottle and allowing slow solvent evaporation, the concentration of the solution will slowly increase so that eventually a saturated state is reached. This is the starting point for crystallization. As will be discussed below in more detail, crystallization under substantially saturated conditions requires taking appropriate measures to keep the solution system always as close as possible to the solubility-pH profile.

When dealing with a weakly acidic compound HA instead of a weak base, the pertinent solubility profile has the general appearance shown in FIG. 2. Therefore, when adapting the above described crystallization procedure to a weak acid, it will generally be necessary to start with an unsaturated solution at high pH-values and to gradually reduce the pH-value until reaching a target: point on the solubility-pH profile.

When dealing with an ampholytic compound, it is possible in principle to start out either at a very high or at a very low pH-value and move toward a target pH-value of the corresponding part of the solubility-pH profile.

Figure 6:
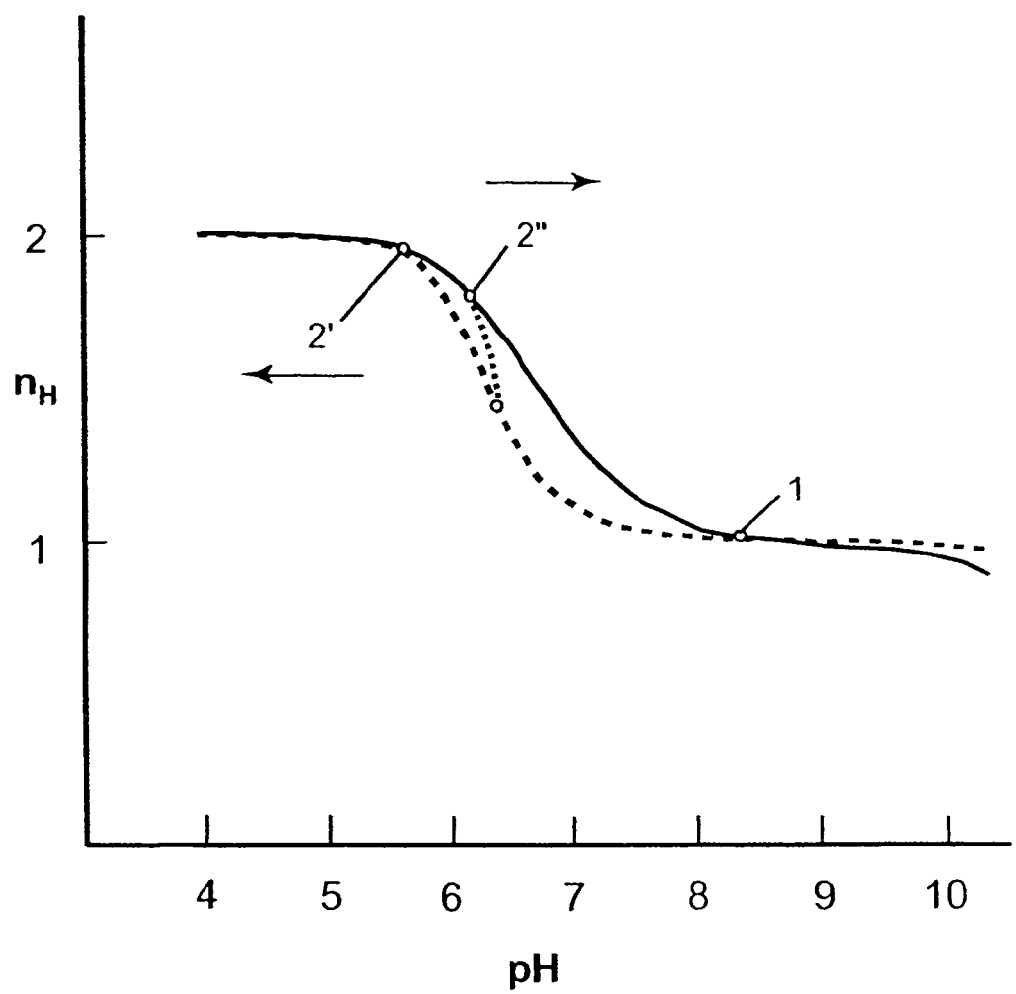
FIG. 6 shows a Bjerrum plot of famotidine, with the solid line representing the reference situation without precipitate and the circles showing data taken by titration from low to high pH.

It is helpful to use as a reference curve the Bjerrum plot for the titration in the absence of precipitate. With the help of this reference curve, the points 1 and 2' in the solubility profile can be defined in Bjerrum plot. This is shown in FIG. 6 for famotidine, an ampholytic compound for which we will consider here the behavior as a base at comparatively low pH-values. The solid line in FIG. 6 represents the reference situation without precipitate whereas the circles show data taken by titration from low to high pH value. The experimental curve meets the reference curve at two different points. The first one is the same as the point 2' in the solubility profile. It indicates reaching of the maximum concentration of the uncharged form in solution. At this point, the concentration of the charged form is still high, but the uncharged form has already reached its maximum concentration. Continuing the titration to change the pH value in the direction of getting more insoluble form, the concentration of the ionic form is observed to sink. More and more $BH^+$ is transformed into the precipitate, $B_{(s)}$, with loss of $H^+$ while the concentration of the uncharged form stays constant. This will continue until reaching the other intersection of the experimental and reference curves. This intersection point is the same as point 1 in the solubility profile. At this point, the precipitation is completed and the ionic form has reached its concentration minimum and nearly only uncharged form is present in the solution. Between points 2' and 1 the compound shows an apparent $pK_a$-value (i.e. $pK_a^{APP}$) as because of the presence of precipitate. As explained above, $pK_a^{APP}$ is shifted to higher values for acids and to lower values for bases.

Practical Considerations

Carrying out the crystallization with a saturated solution, i.e. avoiding supersaturation, strongly reduces the risk of forming amorphous solid. Therefore, it is helpful to have a method to study the tendency of a compound to form saturated solutions. This may be done by comparing the solubility-pH profiles or the Bjerrum plots taken with the pSol method using opposite directions of titration. This will be explained by using famotidine as an example and referring to the Bjerrum plot shown in FIG. 6. The experimental curve of FIG. 6 was taken by starting at a comparatively high pH-value around 11, where the insoluble form predominates. As already explained above, the deviation of the experimental curve from the reference curve in the range between points 1 and 2' is due to the presence of precipitate. By titration from higher to lower pH-values, there is no supersaturation.

If the direction of titration is reversed, i.e. if famotidine is titrated from its soluble to insoluble form by increasing the pH-value, the experimentally determined Bjerrum curve will generally show a deviation from the experimental Bjerrum curve obtained in the other direction. Specifically, supersaturation will cause precipitation not to begin at the target point 2', but rather at a point 2" at a somewhat higher pH-value. In other words, the experimental data for the titration from low to high pH-value will follow the reference curve until reaching point 2". Furthermore, at point 2", where precipitation starts, the crystallization rate will be so large that there is a substantial likelihood of forming amorphous solid.

Accordingly, in order to obtain good crystallization results, the concentration of uncharged compound in solution should be kept equal to its intrinsic solubility value.

In the simplest approach, it is sufficient to approach the target point 2' and then simply keep the pH-value substantially constant while inducing a slow evaporation of said solvent. This will work if the amount of dissolved compound is substantially larger than the amount of solid that is collected in form of crystals. In other words, one needs to use comparatively large amounts of solution and collect comparatively small amounts of crystals. Crystallization will then be carried out essentially at the target point 2' only.

In most situations, however, it will be desirable to collect as much crystalline solid as possible. This means that after reaching the target point 2' the system will evolve along the solubility profile as shown in FIG. 5. Accordingly, it will be necessary to adapt the pH-value to the changing concentration or vice versa.

In practice, this may be achieved by monitoring the concentration of the uncharged form and regulating the pH-value so that the concentration of the uncharged form is kept within a predefined tolerance range above the intrinsic solubility. Alternatively, one may monitor the total concentration of the compound and regulate the pH-value so that the total concentration is kept within a predefined tolerance range above the predetermined total solubility profile.

This may be done by appropriate adaptation of an apparatus such as those used for potentiometric solubility measurements. In addition to a container for the solution and a suitable probe for measuring the pH-value of said solution, the apparatus comprises dosing means for adding controlled amounts of acid and base to said solution. Moreover, the apparatus comprises a sensor device for measuring the concentration of at least one compound form present in solution and a control unit that acts on the dosing means in response of signals received from the pH-probe and from the sensor means. The dosing means are programmed to regulate the pH-value so as to match a predefined profile.

Preferably, the container is made of glass and may be equipped with stirring means, such as a magnetic stirrer. The probe for measuring the pH-value may be a conventional glass electrode, although other probe types known in the art may be used. Dosing means for adding controlled amounts of acid and base solutions, for example 1 N HCl— and NaOH— or KOH-solutions, may comprise dispenser glass tubes leading into the container and appropriate volume dosage units. The sensor means will generally depend on the identity of the species to be detected; for example, these may be UV or visible light photometric probe systems. The control means generally include a number of signal input channels, namely for inputting signals from the pH-probe, the sensor means and other monitoring devices, e.g. thermometric devices. Moreover, the control means will include a programmable unit and input means for loading the required specifications, most notably a solubility profile, and for entering certain operator commands.

Concentration Effects

When allowing evaporation during crystallization, the resulting change of concentration will cause a shift of apparent $pK_a$ value according to the following equation:

$$\log S_0 = \log \frac{C}{2} - |pK_a^{APP} - pK_a|$$

Figure 7:
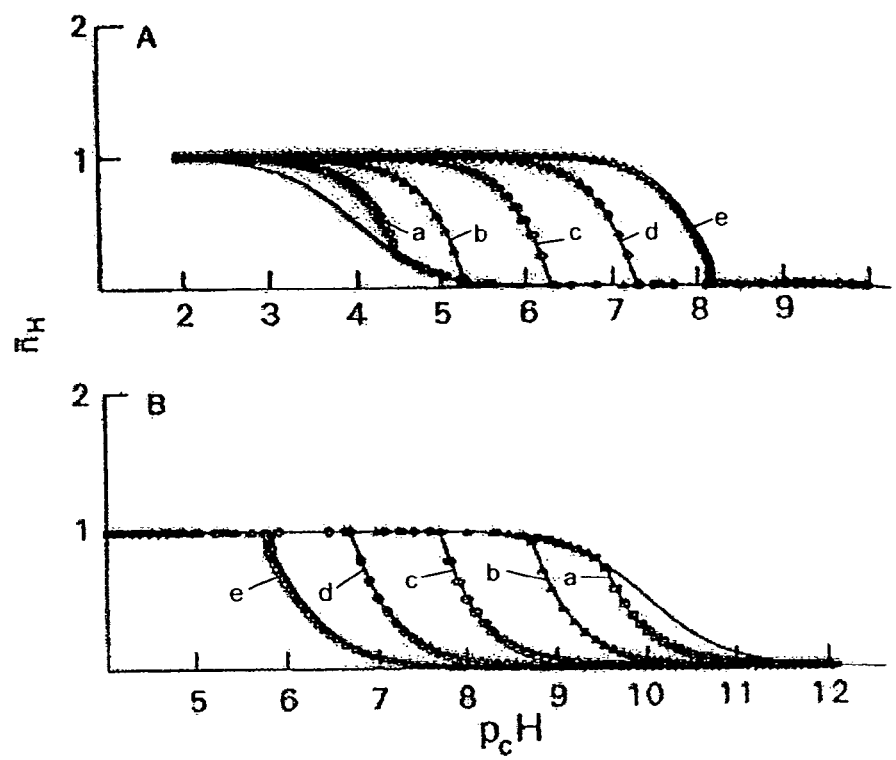
FIG. 7 shows for a weak acid (A) and a weak base (B) a series of Bjerrum plots at different substance concentrations (a): 0.02 mg/ml, (b): 0.1 mg/ml, (c): 1.0 mg/ml, (d): 10 mg/ml and (e): 100 mg/ml.

A 10-fold change in concentration leads to an apparent shift of $pK_a$ value by about 1 log unit. This is illustrated in FIG. 7, which shows a series of Bjerrum plots with different amounts of sample added, for a weak acid (A) and a weak base (B), both with a molecular weight of 300 and intrinsic solubilities of 5 ug/mL ($pS_0$=4.8) and salt solubilities 75 mg/mL ($pS_A$, $pS_{BH}$=0.6). The sample concentrations were (a): 0.02 mg/ml, (b): 0.1 mg/ml, (c): 1.0 mg/ml, (d): 10 mg/ml and (e): 100 mg/ml. As seen in FIG. 5, with increasing sample concentration the curves are shifted upwards from the $pK_a$ for the weak acid and they are shifted downwards from the $pK_a$ for the weak base.

In other words, the solubility-pH profile depends on the apparent $pK_a$ value, resp. the total concentration of the compound. Therefore, the solubility-pH profile should be continuously updated by measuring the pH-value, the total concentration of the compound and applying appropriate corrections, which in the case of a weak base are given by $$\log S_0 = \log \frac{C}{2} + pK_a^{APP} - pK_a$$

and $$\log S = \log\left(1 + \frac{[H^+]}{K_a^{APP}}\right) + \log S_0$$

Figure 8:
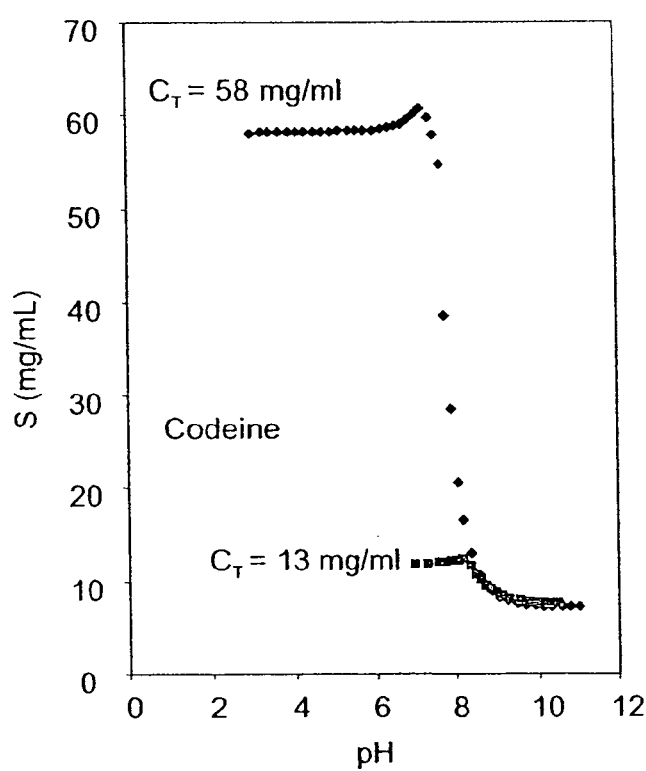
FIG. 8 shows solubility-pH profiles of codeine with different starting concentrations.

However, FIG. 7 shows that under certain conditions the influence of apparent $pK_a$ value, resp. the total concentration of the compound on the solubility-pH profile is limited. In practice, the change of the concentration should be less than 5 fold. As shown in FIG. 8, when using codeine with a total concentration about 58 mg/mL for the titration, the precipitation begins at a pH of about 7. When using codeine with a total concentration of about 13 mg/mL for the titration, the precipitation begins at pH about 8. Nevertheless, the two solubility-pH profiles are seen to overlap at high pH-values. Because in the crystallization procedure described further above the pH-titration stops at a point very closed to the target point 2' on the solubility-pH profile, the total concentration of the solution usually does not change by more than 5 fold from the beginning until crystallization occurs. Under these circumstances, the solubility-pH profile can be considered as almost independent of the concentration of the solution.

The invention claimed is:

1. A method for crystallization of a weakly acidic and/or weakly basic compound, said compound having an uncharged form and at least one charged form, said method comprising the steps of:
   a) providing a solution of said compound in a solvent having an initial pH-value and an initial total concentration of said compound, said initial pH-value being chosen such that the compound is present in said solution predominantly in said charged form, said initial total concentration being chosen larger than the intrinsic solubility of said uncharged form;

b) gradually changing the pH-value of said solution in a direction that leads to a decrease of said compound's solubility until reaching a predetermined target pH-value at which said solution is in a substantially saturated state and the concentration of said uncharged form is substantially equal to said intrinsic solubility thereof; and c) maintaining said solution in a substantially saturated state while allowing formation of crystals of said compound.

2. The method of claim 1, wherein said step b) further comprises raising the total concentration of said compound.

3. The method of claim 1, wherein said step c) comprises keeping the pH-value substantially constant while inducing a slow evaporation of said solvent.

4. The method of claim 1, wherein said step c) comprises monitoring the concentration of said uncharged form and regulating the pH-value so that the concentration of said uncharged form is kept within a predefined tolerance range above said intrinsic solubility thereof.

5. The method of claim 1, wherein said step c) comprises monitoring the total concentration of said compound and regulating the pH-value so that the total concentration of said compound is kept within a predefined tolerance range above a predetermined total solubility profile.

* * * * *